(12) United States Patent
Mueller et al.

(10) Patent No.: US 9,468,982 B1
(45) Date of Patent: Oct. 18, 2016

(54) AUTOMATED KEY DUPLICATION SYSTEM AND METHOD

(71) Applicant: The Hillman Group, Inc., Cincinnati, OH (US)

(72) Inventors: Michael A. Mueller, Phoenix, AZ (US); George Lynn Hagen, Las Vegas, AZ (US); Scott Basham, Chandler, AZ (US); Mark Tarter, Mesa, AZ (US); Ryan Hamblin, Apache Junction, AZ (US); Carl Ito, Scottsdale, AZ (US); Kenneth C. Booth, Mesa, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 630 days.

(21) Appl. No.: 13/941,447

(22) Filed: Jul. 12, 2013

Related U.S. Application Data

(63) Continuation-in-part of application No. 13/440,932, filed on Apr. 5, 2012, which is a continuation-in-part of application No. 13/291,934, filed on Nov. 8, 2011, now Pat. No. 8,992,145, which is a (Continued)

(51) Int. Cl.
   *B23C 3/35* (2006.01)

(52) U.S. Cl.
   CPC .............. *B23C 3/35* (2013.01); *B23C 3/355* (2013.01); *B23C 2235/12* (2013.01); *B23C 2235/28* (2013.01); *B23C 2235/41* (2013.01)

(58) Field of Classification Search
   CPC ..... B23C 3/35; B23C 3/355; B23C 2235/12; B23C 2235/41; Y10T 409/300952; Y10T 409/301008; Y10T 409/301064
   See application file for complete search history.

(56) References Cited

U.S. PATENT DOCUMENTS

| | | | |
|---|---|---|---|
| 2,148,667 A | 2/1939 | Yoskowitz et al. | |
| 3,116,665 A | 1/1964 | Reisner | |
| 3,323,420 A | 6/1967 | Roxburgh | |
| 3,358,561 A | 12/1967 | Roxburgh et al. | |
| 3,413,892 A | 12/1968 | Casey et al. | |
| 3,442,174 A | 5/1969 | Weiner et al. | |
| 3,602,092 A | 8/1971 | Richens | |
| 3,682,041 A | 8/1972 | Essig | |

(Continued)

FOREIGN PATENT DOCUMENTS

| | | | | |
|---|---|---|---|---|
| GB | 952978 A | * | 3/1964 | ............... B23C 3/35 |
| WO | WO2008/066857 A2 | | 6/2008 | |

*Primary Examiner* — Sunil K Singh
*Assistant Examiner* — Ryan Rufo
(74) *Attorney, Agent, or Firm* — Finnegan, Henderson, Farabow, Garrett & Dunner LLP

(57) ABSTRACT

An automated key duplication system that includes a system housing, a key identification system, a key cutting system, a key blank storage system, a key blank transfer assembly, and a duplicated key retrieval opening is disclosed. The key identification system may be housed at least partially within the system housing and is configured to identify a master key. The key blank storage system comprises a plurality of rods configured to removably couple to a plurality of key carriers. The key blank transfer assembly is housed within the housing is configured to remove one key carrier of the plurality of key carriers from the key blank storage system with the key retrieving apparatus and transport the one key carrier and the key blank coupled thereto from the key blank storage to the key cutting system. The duplicated key retrieval opening is positioned on the housing to receive the one key blank after the one key blank has been cut.

11 Claims, 11 Drawing Sheets

Related U.S. Application Data continuation-in-part of application No. 13/183,982, filed on Jul. 15, 2011, now Pat. No. 9,073,133, said application No. 13/941,447 is a continuation-in-part of application No. 13/292,023, filed on Nov. 8, 2011, now Pat. No. 9,149,877, and a continuation-in-part of application No. 13/728,890, filed on Dec. 27, 2012.

(60) Provisional application No. 61/671,058, filed on Jul. 12, 2012, provisional application No. 61/411,401, filed on Nov. 8, 2010, provisional application No. 61/432,089, filed on Jan. 12, 2011, provisional application No. 61/497,468, filed on Jun. 15, 2011, provisional application No. 61/413,099, filed on Nov. 12, 2010, provisional application No. 61/411,148, filed on Nov. 8, 2010, provisional application No. 61/364,644, filed on Jul. 15, 2010.

(56) References Cited

U.S. PATENT DOCUMENTS

| | | | | |
|---|---|---|---|---|
| 3,796,130 | A | 3/1974 | Gartner | |
| 3,865,011 | A | 2/1975 | Patriquin | |
| 3,978,764 | A | 9/1976 | Patriquin | |
| 4,159,783 | A | 7/1979 | Crasnianski | |
| 4,666,351 | A | 5/1987 | Marchal | |
| 4,741,652 | A | 5/1988 | Marchal | |
| 4,752,876 | A | 6/1988 | Couch et al. | |
| 5,172,829 | A | 12/1992 | Dellicker, Jr. | |
| 5,311,758 | A * | 5/1994 | Neitzke | A45C 11/326 206/37.1 |
| 5,807,042 | A | 9/1998 | Almblad et al. | |
| 6,065,911 | A * | 5/2000 | Almblad | B23C 3/35 250/202 |
| 7,377,402 | B2 * | 5/2008 | Takeda | G07F 11/10 221/155 |
| 2008/0145163 | A1 * | 6/2008 | Freeman | B23C 3/35 409/83 |

\* cited by examiner

AUTOMATED KEY DUPLICATION SYSTEM AND METHOD

CROSS REFERENCE TO RELATED APPLICATIONS

This document claims the benefit of the filing date of U.S. Provisional Patent Application 61/671,058, entitled "Key Duplication Housing and Standard Reference Features" to Mueller et al., which was filed on Jul. 12, 2012, the contents of which are hereby incorporated by reference.

This application is also a continuation-in-part application of the earlier U.S. Utility Patent Application to Hagen, et al. entitled "Master Key Identification and Feedback System," application Ser. No. 13/440,932 filed Apr. 5, 2012, now pending, which is a continuation-in-part of the earlier U.S. Utility Patent Application to Mueller et al. entitled "Multi-Key Duplication, Identification and Cutting Machine with Clamp," application Ser. No. 13/291,934 filed Nov. 8, 2011, now pending, and is a continuation in part application of the earlier U.S. Utility patent application Ser. No. 13/292,023 to Mueller et al. entitled "Interaction between a Key Duplication Housing and a Key Blank Carrier," filed on Nov. 8, 2011, now pending, all of which are continuation-in-part applications of U.S. Utility Patent Application to Mueller et al. entitled "Key Blank Carrier Adapted for Positioning a Key Blank in a Cutter During Bit Cutting," application Ser. No. 13/183,982 filed Jul. 15, 2011, now pending, which claims the benefit of the filing dates of U.S. Provisional Patent Applications: 61/413,099 to Hagen et al. entitled "Key Duplication Machine Cutting System," which was filed on Nov. 12, 2010, 61/497,468 to Hagen et al. entitled "Key Packaging and Duplication Systems," which was filed on Jun. 15, 2011, 61/411,148 to Mueller et al. entitled "Key Duplication Machine Identification System" which was filled on Nov. 8, 2010, and 61/364,644 to Hagen et al. entitled "Key Duplication Packaging and Standard Reference Features," which was filed Jul. 15, 2010, the disclosures of each of which are hereby incorporated herein by reference.

This application is also a continuation-in-part application of the earlier U.S. Utility Patent Application to Mueller, et al. entitled "Key Blank Carrier Adapted for Positioning a Key Blank in a Cutter During Bit Cutting," application Ser. No. 13/728,890, filed Dec. 27, 2012, now pending, which is also a continuation-in-part application of U.S. Utility Patent Application to Mueller et al. entitled "Key Blank Carrier Adapted for Positioning a Key Blank in a Cutter During Bit Cutting," application Ser. No. 13/183,982 filed Jul. 15, 2011, now pending, the disclosures of each of which are hereby incorporated herein by reference.

BACKGROUND

1. Technical Field

Aspects of this document relate generally to key duplication systems and methods.

2. Background Art

Conventionally, when a master key for opening a lock is duplicated, it is duplicated by first classifying the master key to be able to identify an appropriate key blank for the duplicate key, selecting the appropriate key blank to match the master key, placing the selected key blank in a key cutter, and cutting the bit pattern of the master key into a blade of the key blank. Methods such as tracer bars and image capture are known for use in identifying a master key bit pattern.

Conventional systems have required the operation skills of a trained worker to properly select the appropriate key blank. An example of an elaborate system used to assist a trained worker in selecting an appropriate key blank and appropriately positioning the appropriate key blank and master key for cutting is disclosed in U.S. Pat. No. 5,443,339 to Heredia et al., titled "Method and Apparatus for Aligning and Cutting Single-sided and Double Sided Keys." In Heredia, a plurality of clamping units, each comprising its own clamp and cutter fixturing is provided. The trained worker selects an appropriate key blank and an appropriate clamping unit for the particular key blank and clamps the key blank into the unit. Then the trained worker couples the clamping unit with a cutting wheel for cutting. More recent master key identification systems, such as that disclosed in U.S. Pat. No. 6,836,553 to Campbell et al., titled "Key Identification System," the disclosure of which is hereby incorporated herein by reference, automatically identifies the appropriate key blank and indicates that number for key selection.

A recent key duplication system described in International Application Number PCT/US2007/024522 to Freeman, et al. titled "Fully Automatic Key Duplicating Machine with Automatic Key Model Identification System" sought to reduce the need for the operational skills of a trained worker by automatically identifying master keys and automatically cutting and dispensing a duplicate key from a limited selection of keys within the key duplication system. Another recent key duplication system described in U.S. Pat. No. 7,890,878 to Bass et al., titled "Object Identification System," discloses a system that identifies an appropriate key blank by flashing a light adjacent the appropriate key blank on a product display next to a key blank cutter so that the user or a trained worker can select the appropriate key for insertion into the key blank cutter.

SUMMARY

Various key duplication systems and methods of duplicating a key are disclosed herein. According to one aspect, an automated key duplication system comprises a system housing, a key identification system, a key cutting system, a key blank storage system, a key blank transfer assembly, and a duplicated key retrieval opening. The key identification system is housed at least partially within the system housing and configured to identify a master key. The key cutting system is housed within the system housing. The key blank storage system is housed within the housing and comprises a plurality of rods, a plurality of key carriers removably coupled to the plurality of rods, and a plurality of key blanks, each one of the plurality of key blanks coupled to a different one of the plurality of key carriers. The key blank transfer assembly is housed within the housing and comprises a key retrieving apparatus. The key blank transfer assembly is configured to remove one key carrier of the plurality of key carriers from the key blank storage system with the key retrieving apparatus and transport the one key carrier and the key blank coupled thereto from the key blank storage to the key cutting system. The duplicated key retrieval opening is positioned on the housing to receive the one key blank after the one key blank has been cut.

Particular implementations and embodiments comprise one or more of the following. One or more processors in communication with the key identification system, the key cutting system, the key blank storage system, and the key blank transfer assembly, wherein the one or more processors are configured to receive master key information from the key identification system, access a database defining a plurality of known key models, compare physical characteristics of the master key with physical characteristics of key models in the database to identify a model of the master key, and determine one or more key blanks of the plurality of key blanks that are suitable for cutting to match the master key. The key retrieving apparatus may be movable along a vertical axis and a horizontal axis to align with the one key carrier, and moveable from the key blank storage system to a key blank receiving aperture of the key cutting system. The plurality of key carriers may be positioned by key blank type in at least two rows and at least two columns in the key blank storage system. Each of the plurality of key carriers are removably mounted between slots on adjacent rods of the plurality of rods. The key blank transfer assembly may further comprise a horizontal belt system that moves the key retrieving apparatus along the horizontal axis and a vertical belt system that moves the key retrieving apparatus along the vertical axis. The key blank storage system may comprise a double sided storage system comprising two opposing series of rods of the plurality of rods, wherein the key blank transfer assembly is positioned between two opposing series of rods of the plurality of rods, the key retrieving apparatus having access to key carriers mounted among each of the two opposing series of rods. A plurality of linear springs, each linear spring coupled to a different rod of the plurality of rods and configured to bias the plurality of key carriers towards the key blank transfer assembly. Each key carrier of the plurality of key carriers comprises one or more apertures and the key retrieving apparatus comprises one or more tabs positioned to engage with the one or more apertures when the key blank transfer assembly moves the one key carrier from the key blank storage system to the key cutting system. A user interface in electronic communication with the one or more processors. The key retrieving apparatus may comprise a clamp and the plurality of rods comprises at least four rods, each of the four rods extending through an aperture on a different one or more of the plurality of key carriers.

According to another aspect, an automated key duplication system comprises a system housing, a key identification system, a key cutting system, a key blank storage system, a key blank transfer assembly, and a duplicated key retrieval opening. The key identification system is housed at least partially within the system housing and configured to identify a master key. The key cutting system is housed within the system housing. The key blank storage system is housed within the housing and comprises a plurality of rods configured to couple to a plurality of key blanks. The key blank transfer assembly is housed within the housing and comprises a key retrieving apparatus, the key retrieving apparatus movable along a vertical axis and a horizontal axis to align with one key blank of the plurality of key blanks and configured to remove the one key blank of from the key blank storage system and transport the one key blank coupled thereto from the key blank storage to the key cutting system when the plurality of key blanks are individually coupled to the plurality of rods. The duplicated key retrieval opening is positioned on the housing to receive the one key blank after the one key blank has been cut.

Particular implementations and embodiments comprise one or more of the following. The key blank transfer assembly further comprises a horizontal belt system that moves the key retrieving apparatus along the horizontal axis and a vertical belt system that moves the key retrieving apparatus along the vertical axis. The key blank storage system comprises a double sided storage system comprising two opposing series of rods of the plurality of rods, wherein the key blank transfer assembly is positioned between two opposing series of rods of the plurality of rods, the key retrieving apparatus having access to key carriers mounted among each of the two opposing series of rods. A plurality of linear springs, each linear spring coupled to a different rod of the plurality of rods and configured to bias the plurality of key blanks towards the key blank transfer assembly when the plurality of key blanks are coupled to the plurality of rods.

According to another aspect, a method of key duplication comprises identifying a master key with a key identification system within a housing, moving a key blank transfer assembly along a vertical axis and a horizontal axis to align a key retrieving apparatus of the key blank transfer assembly with one key blank of a plurality of key blanks removably coupled to a plurality of rods of a key blank storage system, the key blank transfer assembly housed within the housing, removably coupling the key retrieving apparatus to a key blank carrier coupled to the one key blank, transferring the one key blank from the key blank storage system to a key cutting system housed within the housing, cutting the one key blank to match the master key, and dispensing the cut one key blank.

Particular implementations and embodiments may comprise one or more of the following. determining, with a processor housed within the housing, X-Y coordinates for the one key blank, the processor being in electronic communication with the key identification system, the key blank transfer assembly, and the key cutting system. Inserting the one key blank into a lead-in funnel surrounding a key blank receiver opening on the key cutting system. Removably coupling the key retrieving apparatus to the key blank carrier may comprise clamping the key blank carrier coupled to the one key blank with the key retrieving apparatus, the key retrieving apparatus comprising a key retrieving apparatus, and removing the key blank carrier from a mounted position between two rods of the plurality of rods. Removably coupling the key retrieving apparatus to the key blank carrier coupled to the one key blank may comprise biasing the one key blank toward the key blank transfer assembly with a linear spring coupled to one rod of the plurality of rods.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed aspects, it is intended that these aspects not be limited only to the specific structure, material or acts that are described in the embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended automated key duplication systems and/or assembly procedures for automated key duplication systems will become apparent for use with implementations of automated key duplication systems from this disclosure. Accordingly, for example, although particular systems are disclosed, such systems and implementing components may comprise any shape, size, style, type, model, version, measurement, concentration, material, quantity, and/or the like as is known in the art for such automated key duplication system and implementing components, consistent with the intended operation of an automate key duplication system.

Various embodiments of the automated key duplication systems and methods described herein are configured to allow consumers or other users to duplicate a master key without any prior training or without the assistance of a store employee. As shall be shown in greater detail in embodiments described herein, some automated key duplication systems contemplated in this disclosure are configured such that a consumer is required only to insert the master key into a key identification system and retrieve a duplicated key from the automated key duplication system housing. This configuration is not only easier for the consumer, but reduces the likelihood of human error occurring during key duplication, resulting in a more efficient method and system than those previously known in the art.

Figure 1:
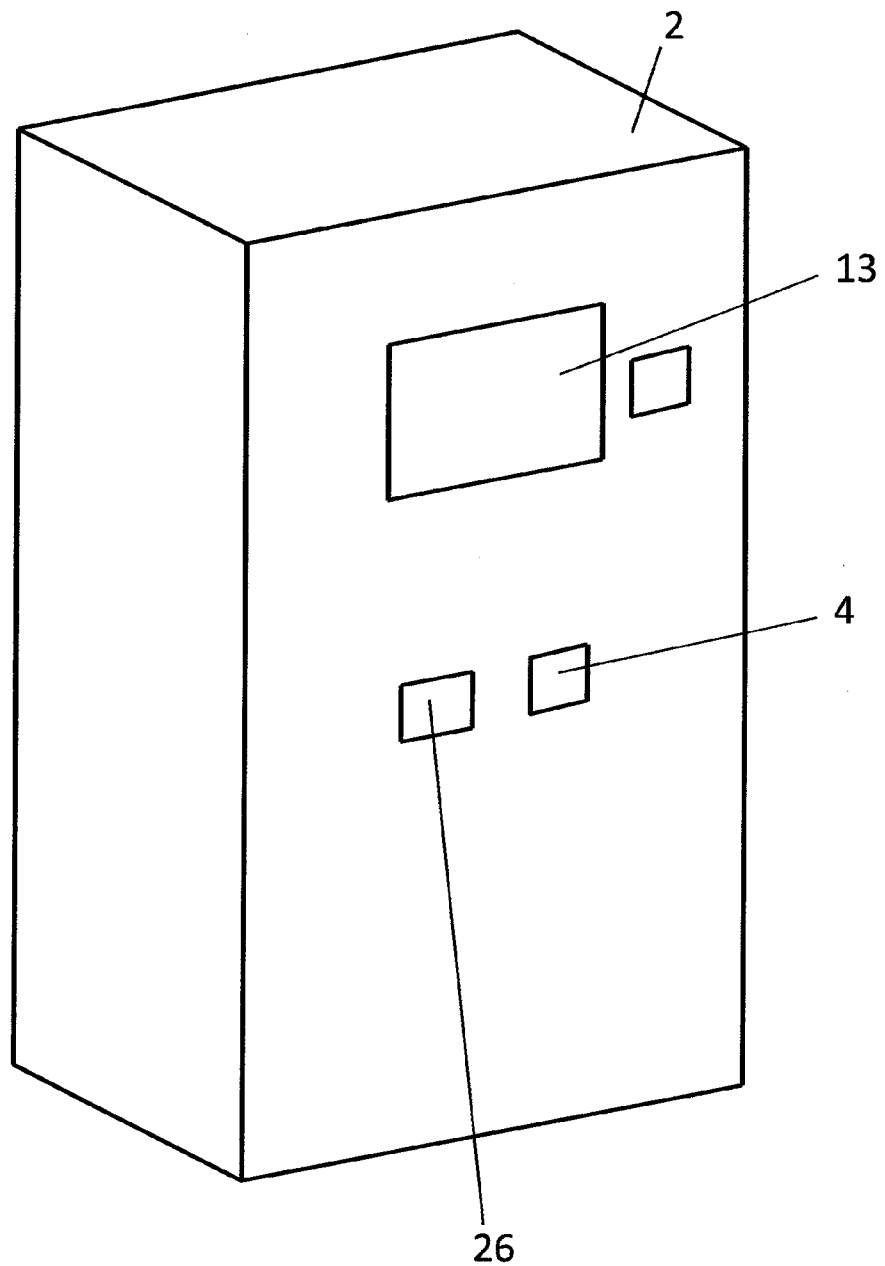
FIG. 1 is a perspective view of the outside of a key duplication system.

FIG. 1 illustrates an embodiment of an automated key duplication system comprising a system housing 2, a key identification system 4 housed at least partially within the system housing 2, a key cutting system 6 housed within the system housing 2, a key blank storage system 8 housed within the system housing 2, a key blank bulk transfer assembly 10 housed within the system housing 2, and a duplicated key retrieval opening 26 positioned on the system housing 2. Any of a number of key identification systems and key cutting systems may be utilized in an automated key duplication system. Many are referenced herein and others have been incorporated by reference. A system housing 2 may comprise any shape, size, configuration, and the like that allows for at least partial housing of the key identification system 2, the key cutting system 6, the key blank storage system 8, the key bank transfer assembly 10, the processor 11, and any necessary payment devices. FIG. 1 illustrates a non-descript housing shape to illustrate that the shape of the housing is not critical to the operation of the components within. By bulk storing key blanks in carriers and then retrieving the key blanks from a known location and transferring the key blanks, when needed, to a different location for cutting, any number of key varieties may be stored and used as requested by customers.

Figure 2:
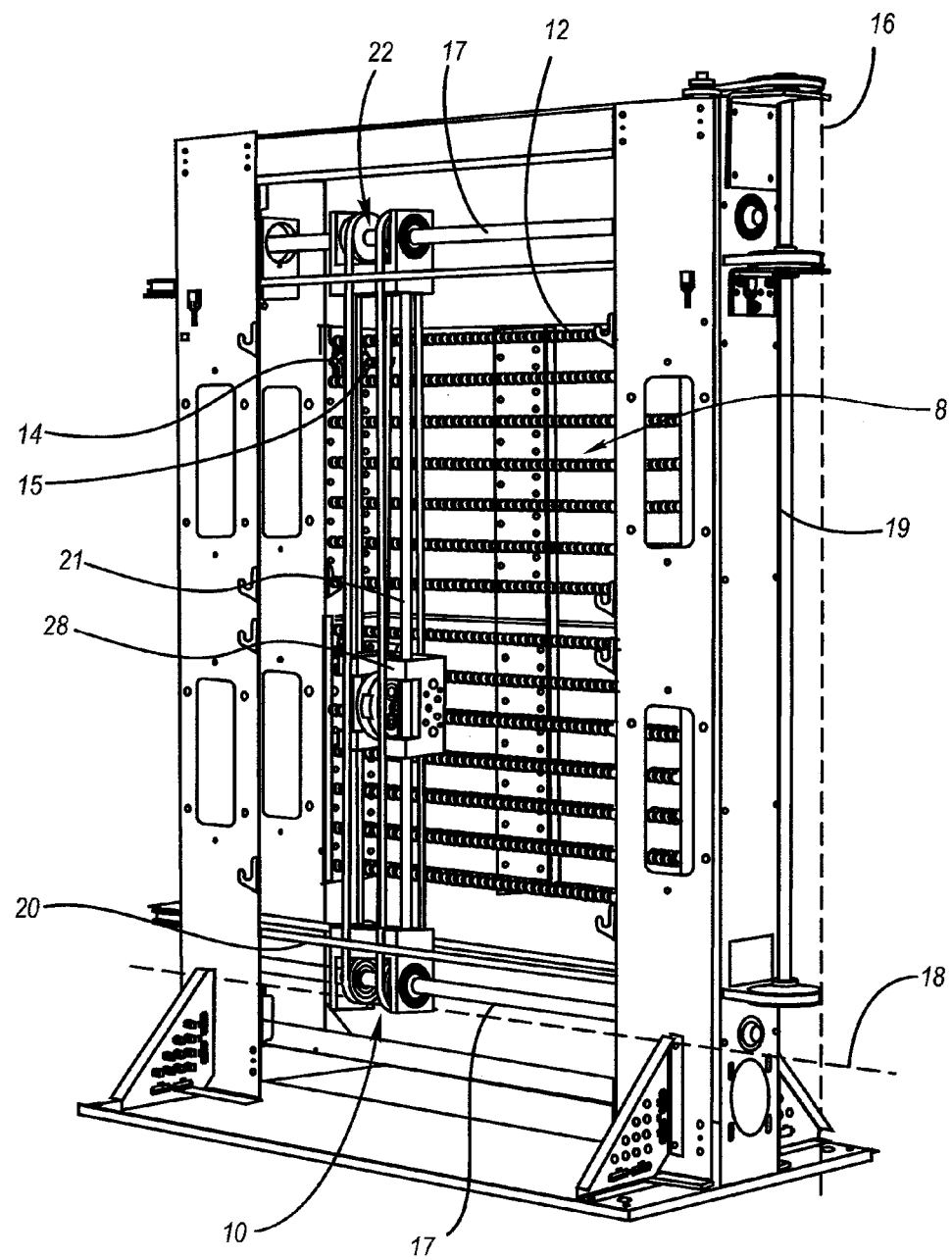
FIG. 2 is a perspective view of a key blank storage system and a key blank transfer assembly.
Figure 3:
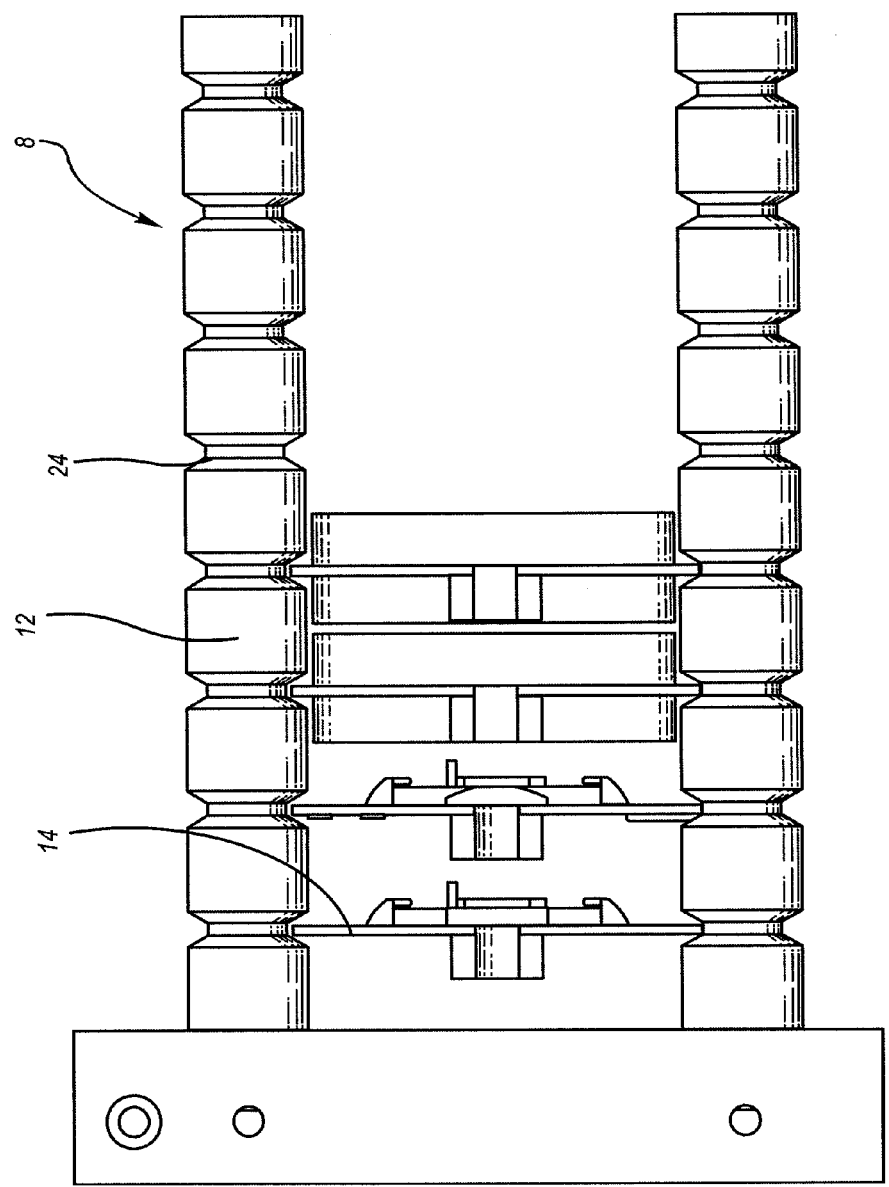
FIG. 3 is a front view of a portion of a key blank storage system.

FIG. 2 illustrates a perspective view of an embodiment of a key blank storage system 8 and a key blank transfer assembly 10. In one or more embodiments, a key blank storage system 8 comprises a plurality of rods 12. The plurality of rods 12 may be arranged horizontally, as in FIG. 2, vertically, or diagonally. As shown in greater detail in FIG. 3, each of the plurality of rods 12 comprises a plurality of slots 24. The slots 24 may comprise grooves partially or wholly circumnavigate the rod 24, and typically comprise a width sufficient to hold a portion of either a key carrier 14 or a key blank 15 (without a carrier) within the slot 24. The slots 24 may be tapered to allow for easier and more precise insertion of the key blanks 15 and/or key carriers 14 when being loaded into the key blank storage system. In specific embodiment shown in FIGS. 2 and 3, two adjacent rods 12 are spaced at a distance from each other that allows either a key carrier 14 or a key blank 15 to be held between the two adjacent rods 12. In particular embodiments, the rods 12 are arranged 2-deep, such that the key carrier 14 is positioned between four total rods 12: two rods 12 on top and two rods 12 on bottom. As best illustrated in FIG. 3, opposing edges of a key carrier 14 are aligned with and held between slots 24 on two adjacent rods 12 for storage until the key blank transfer assembly 10 removes the key carrier 14 from between the adjacent rods 12. Although not shown, it is also contemplated that opposing edges of a key blank 15 may similarly fit between slots 24 of two adjacent rods 12. Positioning of the rods 12 and the slots 24 on the rods 12 creates a grid-like system of key blanks 15 comprising a plurality of rows and columns. For example a plurality of key carriers 14 between two or more rods 12 forms a row of key blanks 15, and alignment of the slots 24 of three or more rods 12 forms at least two columns of key carriers 14. It will also be clear to those of ordinary skill in the art that the described system is not limited to use with key blanks or key carriers. Other products may similarly be loaded into carriers and distributed through this system by skipping the key engraving steps of the method.

Although FIG. 2 illustrates one embodiment of a grid-like system, other grid-like systems within the key blank storage system 8 are also contemplated. For example, key blanks 15 and/or key carriers 14 may hang or be mounted from a plurality of rods, the arrangement of the rods forming a plurality of columns and rows of key blanks 15 and/or key carriers 14. Alternatively, linear springs may bias the key blanks 15 and/or key carriers mounted on a rod toward the key blank transfer assembly 10 for transfer to the key cutting system 6.

Any of a number of key carriers 14 and key blanks 15 may be utilized in any of the automated key duplication systems disclosed herein. For example, any of the key carriers 14 and key blanks 15 described in U.S. patent application Ser. No. 13/292,023, which was previously incorporated by reference, are contemplated. The key carrier 14 may further comprise one or more apertures 30 (shown in FIG. 7) sized and positioned to allow tabs 130 from a key retrieving apparatus 28, 78, 128 to hold the key carrier 14 during transfer and/or during cutting. In the embodiments shown in FIG. 7, the aperture 30 comprises a circular boundary and a guide wall extending from the key carrier 14.

FIG. 2 also illustrates a non-limiting example of a key blank transfer assembly 10. Various embodiments of key blank transfer assemblies contemplated herein are a configured for translational movement across both a horizontal (X) axis 18 and a vertical (Y) axis 16. This configuration allows for retrieval of a key blank 15 and/or key carrier 14 positioned on a grid-system, such as that formed by the slots 24 and rods 12 of the key blank storage system. For example, each key blank 15 and/or key carrier positioned between two rods may be assigned a specific grid location coordinate. When a master key is identified by a key identification system 4, the processor 11 determines a suitable key blank 14 in the key blank storage system 8. In one or more specific embodiments, the key blank transfer assembly 10 comprises a key retrieving apparatus 28, or alternatively a key retrieving apparatus 128 positioned on one end of the mechanical arm, that is configured to retrieve a key blank 15 from the key blank storage system 8. The key retrieving apparatus 28, 128 may move to a specific grid location coordinate in the key blank storage system 8 responsive to a command from the processor 11 after a master key has been identified.

In operation, when a key blank type is determined after key identification and/or selected by a user, the key retrieving apparatus 28 moves along the horizontal axis 18 and vertical axis 16 until the key retrieving apparatus 28 is facing the desired key blank 15 from storage. Once positioned facing the key blank 15, the key retrieving apparatus 28 reaches towards the key blank 15 and grips or otherwise couples to the key blank 15 or the key carrier 14 (see also FIG. 7). Once the selected key blank 14 is gripped or coupled to key retrieving apparatus 28, the key blank transfer assembly 10 moves the key blank 15 from its positioning on the key blank storage system 8 to the key blank receiving opening 132 of the key cutting system 6 at a key cutting station. In one or more embodiments, a lead-in funnel 134, or tapered entry port, surrounds the key blank receiver opening 132 for easier entry of the key blank 15 into the key blank receiver opening 132, although in many cases no lead-in funnel or tapered entry port is needed. The key retrieving apparatus transitionally inserts the key blank 15 and/or key carrier 14 into the key cutting system 6 which cuts the key according to its normal processes. After the key blank 15 is cut, it is removed from the key cutting system 6 by the key retrieving apparatus 28. In one or more embodiments, once the key retrieving apparatus 28 has removed the key blank 15 and/or key carrier 14 from the key blank storage system 8, the key retrieving apparatus 28 moves to a customer return station to drop the key for the customer retrieve, and then may return to its original position or continue to the next operation it needs to execute.

Various configurations of a key blank transfer assembly 10 that allow for horizontal and vertical translational movement are contemplated herein. In the specific embodiment shown in FIG. 2, the key blank transfer assembly 10 comprises a horizontal belt system 20 and a vertical belt system 22. Embodiments utilizing the horizontal 20 and vertical 22 belt systems typically also comprise one or more first support bars 17, such as the two horizontal support bars 17 shown in FIG. 2. The support bar 17 may be positioned substantially horizontal on opposing ends of the key blank transfer system. The support bars 17 are coupled to the belts and gears of the horizontal 20 and vertical 22 belt systems such that the gears slide along the support bars 17. A third belt system 13 (shown in FIG. 4) may also be included to rotate the support bar 17.

Also included in one or more embodiments of the key blank transfer assembly is one or more second support bars, typically a vertical support bar 19. The vertical support bar 19 is operably coupled to the belts and gears of the horizontal belt system 20 such that as the vertical support bar 19 rotates, the belt or belts in the horizontal belt system move the belts and gears of the vertical belt system 22 in a horizontal direction allowing for horizontal movement of the key retrieving apparatus 28. The key retrieving apparatus 28 may be coupled to the belts of the vertical belt system 22 such that as the support bars 17 rotate, the belts of the vertical belt system rotate around the gears, thus moving the key retrieving apparatus 28 in the vertical direction. In one or more embodiments, the key retrieving apparatus 28 is slidably mounted to one or more vertical guide bars 21. As the key retrieving apparatus 28 moves in a substantially vertical direction, the key retrieving apparatus 28 slides vertically along the vertical guide bars 21. Thus in operation, the vertical belt system 22 and the horizontal belt system 22 are configured to move the key retrieving apparatus along the horizontal (X) axis 18 and along the vertical (Y) axis 16 to retrieve a key blank 15 and/or key carrier 14 on a grid like system as described above.

Figure 9:
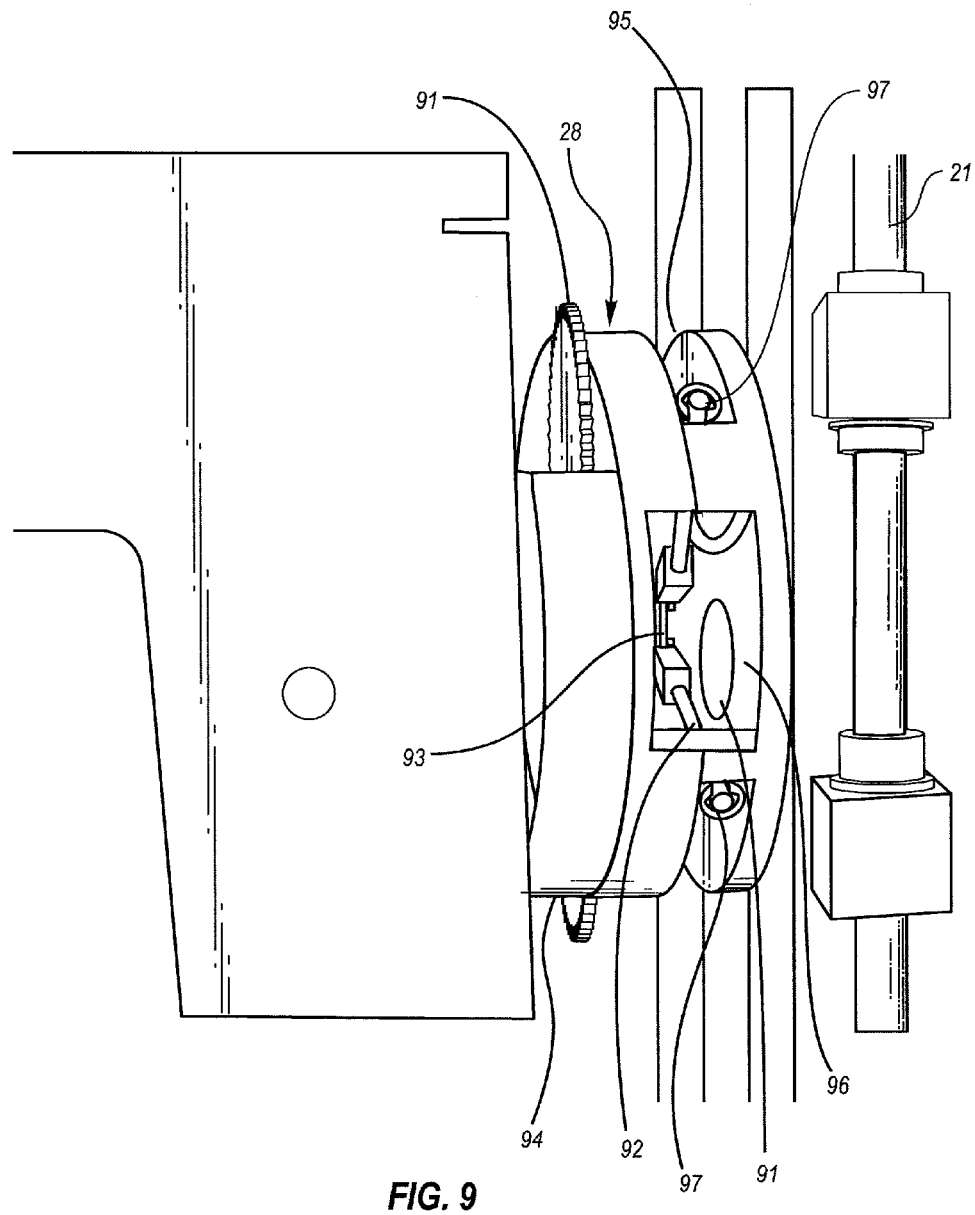
FIG. 9 is a perspective view of a key retrieving apparatus in a retracted position.
Figure 10:
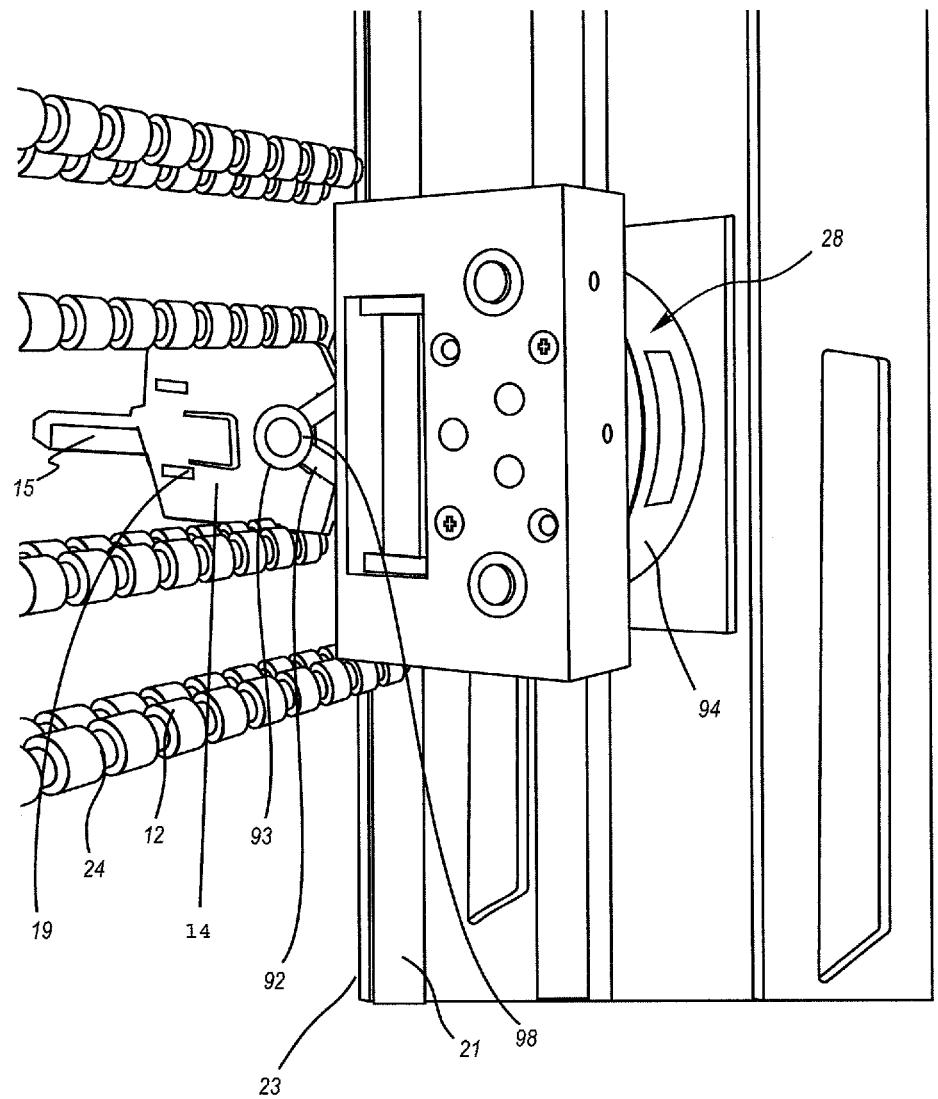
FIG. 10 is a perspective view of a key retrieving apparatus in an extended position.

The key retrieving apparatus 28 may comprise any apparatus any apparatus adapted to retrieve the key carrier 14 and key blank 15 from the key blank storage system 8, move the key carrier 14 and key blank 15 to the key cutting system 6 for cutting, move the key from the key cutting system 6 near a duplicated key retrieval opening 26, release the key carrier 14 and key blank 15 to the duplicated key retrieval opening 26 for customer retrieval. A particular embodiment of a key retrieving apparatus is depicted in FIGS. 2, 9, and 10. In a particular embodiment, the key retrieving apparatus 28 comprises a body 94 with a chamber 96 extending at least partially therethrough. The body 94 is typically cylindrical, although varying embodiments may comprise alternate shapes and configurations.

Particular embodiments of the key retrieving apparatus 28 further comprise a retrieval loop 93 coupled to one or more arms 92. In the embodiment depicted in FIGS. 9 and 10, the key retrieving apparatus comprises two arms 92 coupled to the retrieval loop 93. The arms 92 are operably coupled to one or more gears 91 positioned on or adjacent to the body 94. In operation, the key retrieving apparatus 28 is operable to move the retrieval loop 93 between a retracted position (depicted in FIG. 9) and an extended position (depicted in FIG. 10). In a retracted position, the retrieval loop 93 is positioned at least partially within the chamber 96 of the body 94, while terminating ends 97 of the arms 92 opposite the retrieval loop 93 are positioned within or proximate to slots 95 on the body 94. As such, the arms 92 extend from the chamber 96 through the body 94 to the slots 95.

Responsive to the one or more gears 91, the arms 92 move the retrieval loop 93 from the retracted position within the chamber 96 to the extended position outside the chamber (shown in FIG. 10). As the one or more gears 91 rotate, the terminating ends 97 of the arms move from one side of the body 94 to an opposite side of the body 94. In so doing, the retrieval loop 93 moves from within the chamber 96 to outside the chamber 94. In this extended position, the key retrieving apparatus 28 is positioned to removably couple a key carrier 14. For example, in the particular embodiment depicted in FIG. 10, the retrieval loop 93 coupled to a raised lip 98 on the key carrier 14. The raised lip 98 may extend through a hole on in the retrieval loop 93 when the key carrier 14 is coupled to the retrieval loop 93. Once coupled, the retrieval loop 93 returns to the retracted position within the chamber 96 in particular embodiments. Thus, the chamber 96 is sized to hold the key blank 15 and key carrier 14 therein in certain embodiments.

In operation of a specific embodiment, the key blank transfer assembly 10 moves the key retrieving apparatus 28 to a position on the horizontal (X) axis 18 and vertical (Y) axis 16 to retrieve a particular key blank 15 coupled to a key carrier 14 positioned between a plurality of rods 12. The retrieval loop 93 then moves from a retracted position within the chamber 96 to an extended position outside the chamber and adjacent to the particular key carrier 14. Once adjacent to the particular key carrier 14, the key retrieving apparatus 28 may move the retrieval loop 93 such that a lip 98 of the key carrier 14 is removably coupled to the retrieval loop 93 within a hole extending through the retrieval loop. The retrieval loop 93 may then to the retracted position within the chamber 96 such that the key blank 15 and key carrier are at least partially housed within the chamber 96. The key retrieving apparatus 28 then moves the key blank 15 and key carrier to the key cutting system 6 for cutting where the key blank 15 is cut. Particular embodiments of the key retrieval apparatus 28 are also configured to insert a key carrier 14 back into a position between a plurality of rods 12. This configuration is advantageous when a wrong or undesired key blank 14 is retrieved.

Figure 4:
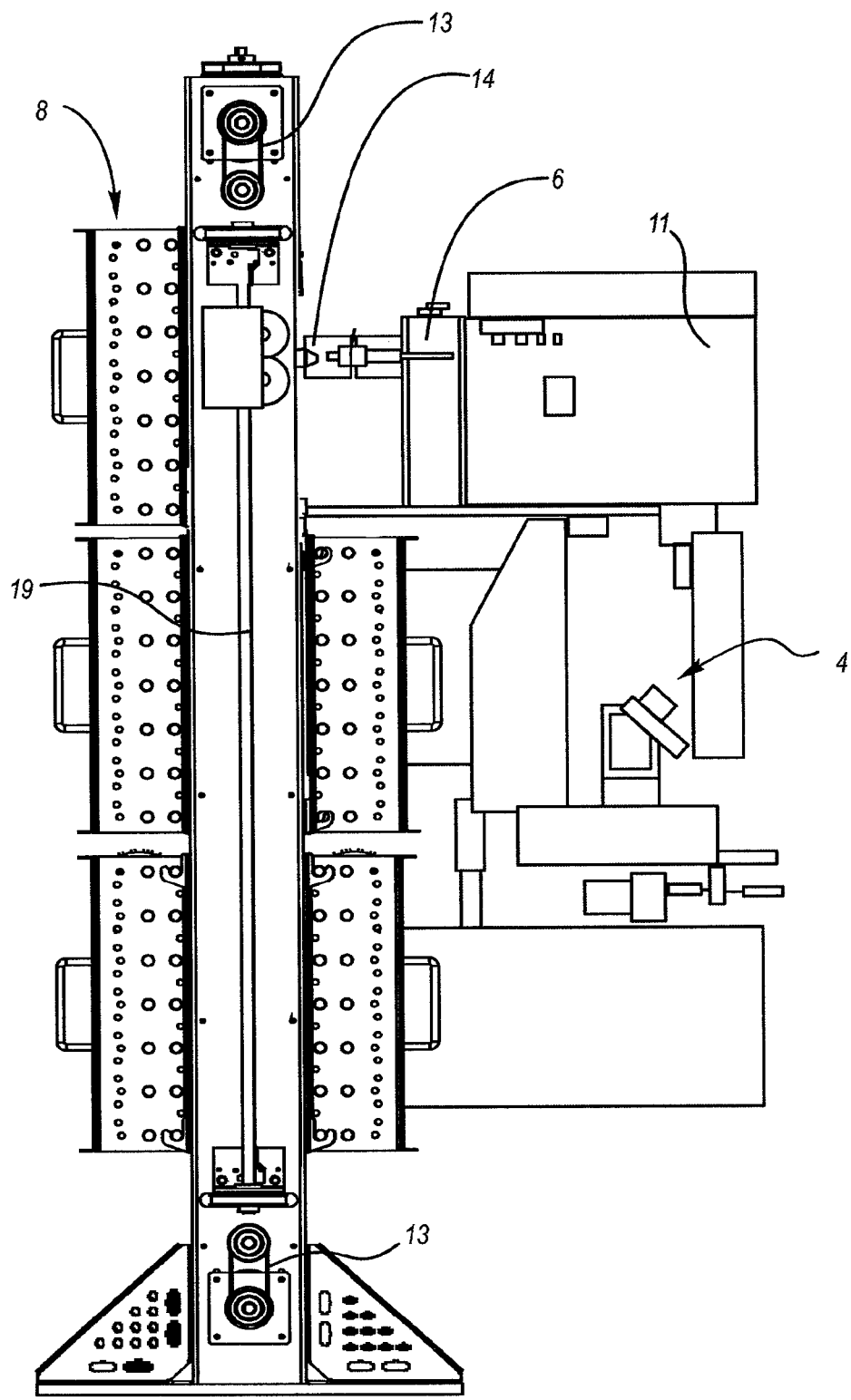
FIG. 4 is a side view of an automated key duplication system.

Embodiments of an automated key duplication system 1 may comprise either a single-sided key blank storage system 8, an example of which is shown in FIG. 2, or a double-sided key blank storage system, an example of which is shown in FIG. 4. In embodiments comprising a double-sided key blank storage system 8, the key blank transfer assembly 10 is typically positioned between the two or more key blank storage systems 8. Various key blanks 15 are stored on the racks formed by the plurality of rods 12 and slots such that the head of the key blank 15 is positioned proximate the key blank transfer assembly 10. The key retrieving apparatus 28 previously described is configured to retrieve key blanks 15 and/or key carriers 14 from either side of a double-sided key blank storage system 8 and move they key blank 15 and/or key carriers as previously described.

Figure 11:
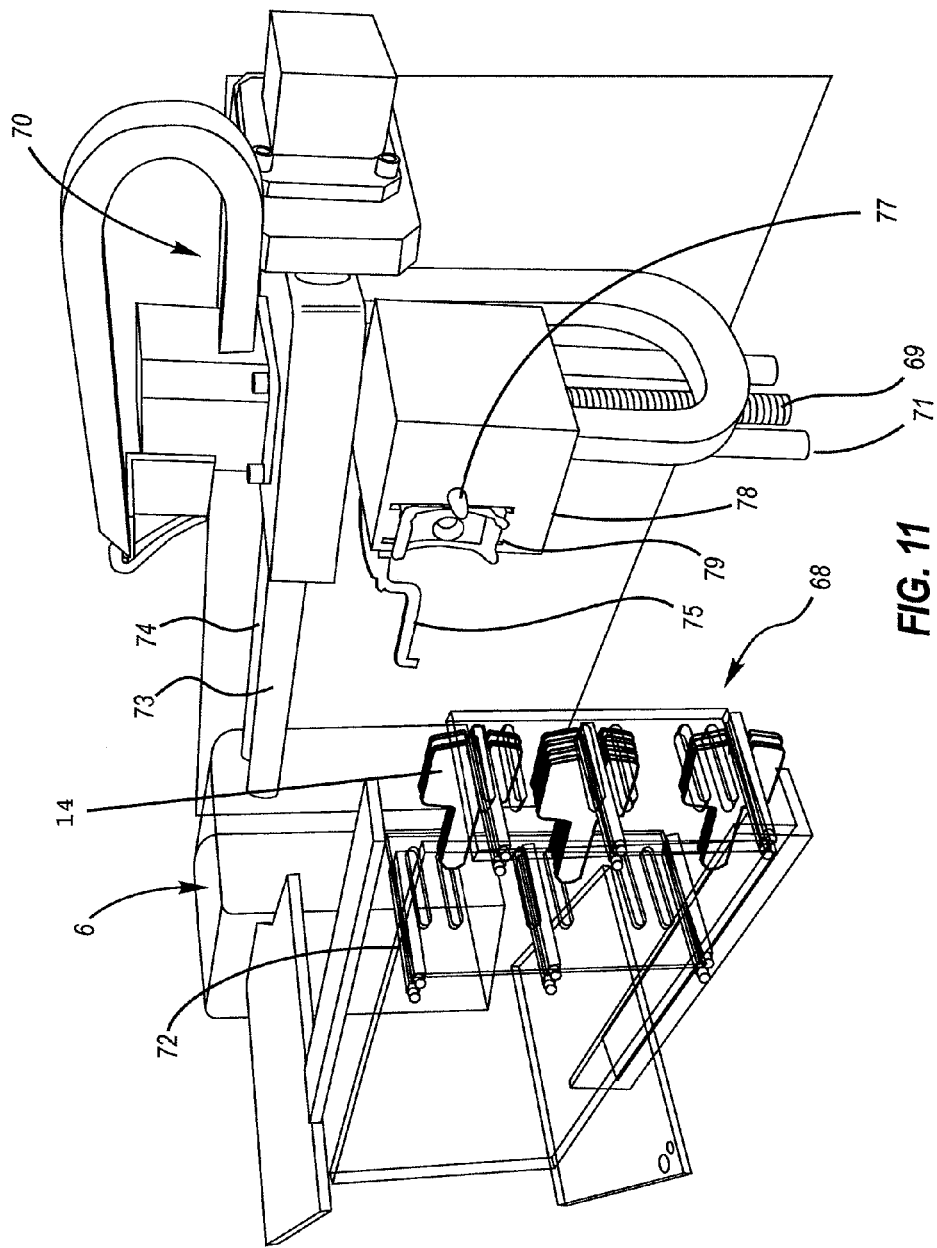
FIG. 11 is a perspective view of a second embodiment of a key blank storage system and a key blank transfer assembly.

Referring now to FIG. 11, in other embodiments, an automated key duplication system comprises a key blank storage system 68. In a particular embodiment of a key blank storage system 68, a plurality of key blanks 15 and/or key carriers 14 are arranged in a grid like system comprising a horizontal (X) axis and a vertical (Y) axis. The key blank storage system 68 typically comprises a plurality of rods 72 upon which one or more key blanks 14 are mounted or otherwise removably coupled. In the specific embodiment depicted in FIG. 11, a plurality of key blanks 14 may be removably coupled on a single rod 72. The rod 72 may extend through an aperture in the key carrier 14 to removably couple the key carrier 14 to the rod 72. The plurality of a key blanks 14 on each rod 72 may each be coupled to a particular type of key blank 15, thus associated a particular coordinate in the key blank storage system 68 with a particular type of key blank 15. More particularly, alignment of the key carriers 15 may be arranged in rows and columns in one or more embodiments. In certain embodiments, a biasing element, such as a spring, is coupled to each rod 72 to push the key blank 15 and/or key carrier 14 toward a terminating end of the rod 72.

The automated key duplication system depicted in FIG. 11 further comprises a key blank transfer assembly 70 comprising a key retrieving apparatus 78. The key blank transfer assembly 70 is configured to move along both a horizontal (X) axis and a vertical (Y) axis to retrieve particular key blanks 15 positioned at specific locations on the key blank storage system 68. The key blank transfer assembly 70 is typically operably coupled to the processor and moves responsive to commands from the processor. The key blank transfer assembly 70 may comprise one or more belts, one more hydraulic elements, gears, threaded screws, one or more biasing elements, any other moving elements known in the art, or any combination thereof configured to move the key blank transfer assembly to retrieve a key blank 15, move the key blank 15 to the key cutting system 6, and/or move the cut key blank 15 to a key retrieval opening 26. In a particular embodiment, the key blank transfer assembly 70 comprises vertical guide bars 71 and horizontal guide bars 73. The vertical guide bars 71 are configured to allow the key retrieving apparatus 78 to move vertically, while the horizontal guide bars 73 are configured to allow the key retrieving apparatus 78 to move horizontally. In a particular embodiment, a rotation of a threaded horizontal screw 74 moves the key retrieving apparatus 78 horizontally, and rotation of a threaded vertical screw 69 moves the key retrieving apparatus 78 vertically. A similar configuration may be utilized in any of the key duplicating systems described throughout this application. Similarly, any of the key blank transfer assemblies described herein may be substituted in the embodiment depicted in FIG. 11 without departing from the scope of this disclosure.

Embodiments of the key retrieving apparatus 78 may comprise any configuration that allows the key retrieving apparatus 78 to grasp a key blank 15 and/or key carrier 14, remove the key blank 15 and/or key carrier 14 from key blank storage system 68, hold the key blank 15 and/or key carrier 14 as the key retrieving apparatus 78 moves the key carrier 14 from the key blank storage system 68 to the key cutting system 6, and hold the key blank 15 and/or key carrier as the key retrieving apparatus 78 moves the key carrier 14 from the key cutting system 6 to the key retrieval opening 26. In the particular embodiment depicted FIG. 11, the key retrieving apparatus 78 comprises a clamp 79, a mounting pin 77, and an extractor 75. The mounting pin 77 is typically sized to support or align the key carrier 14 as clamp 79 holds the key carrier 14 by extending through a hole or notch in the key carrier 14. The mounting rod 77 may also apply force to the key carrier 14 when the key carrier is loaded key cutting system 6. The extractor 75 is shaped and configured to remove pieces of the key carrier 14 left in the key cutting system 6 during cutting (when necessary).

The clamp 79 may comprise two or more opposing arms each having a notch, groove, or corner shaped to support or hold opposing edges of the key carrier 14 as the clamp 79 closes on the key carrier 14. Opening and closing of the clamp 79 may be accomplished through any mechanism previously known in the art. In particular embodiments, the clamp 79 is configured to release the key carrier 14 as the key blank 14 is being cut in the key cutting system 6, then grip the key carrier again after the key blank 14 has been cut by the key cutting system.

Figure 5:
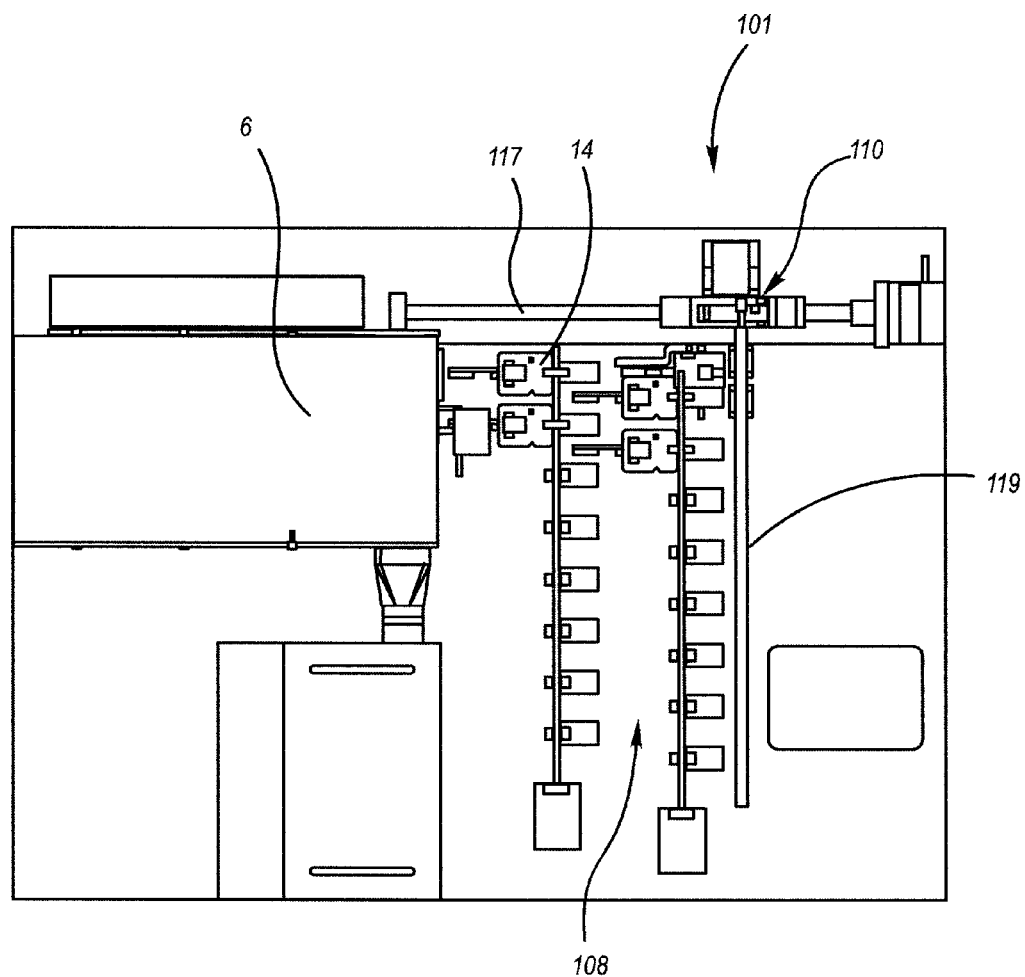
FIG. 5 is a front view of a second embodiment of an automated key duplication system.
Figure 6:
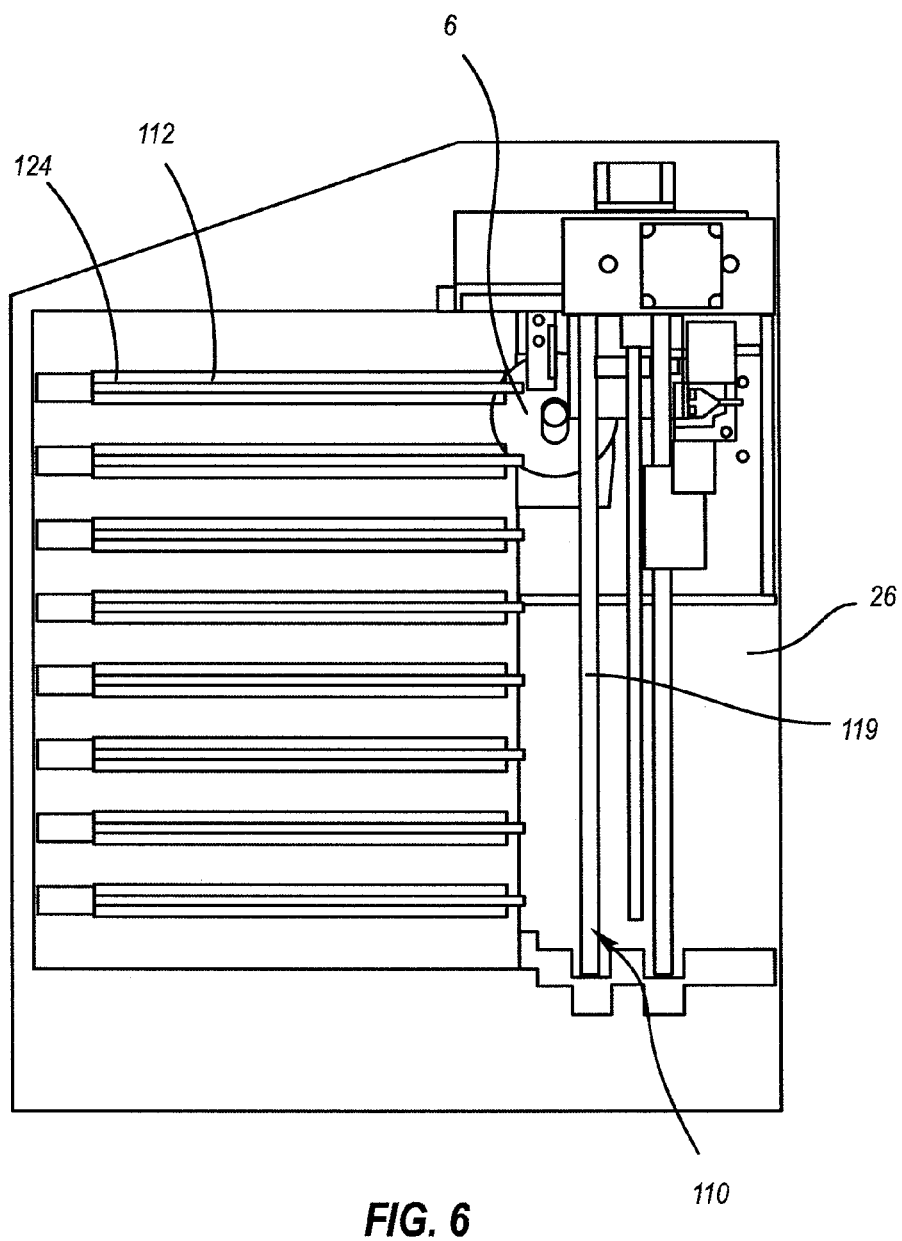
FIG. 6 is a side view of a second embodiment of an automated key duplication system.

FIGS. 5 and 6 illustrate another exemplary embodiment of an automated key duplication system 101. Many of the aspects of the automated key duplication system are similar to those described in relation to the automated key duplication systems previously described. Moreover, various aspects of the automated key duplication systems disclosed herein may be combined with aspects of the other without departing from the scope of this disclosure. Like the automated key duplication system previously described, the automated key duplication system shown in FIGS. 5 and 6 comprises a system housing 2, a key identification system 4, a key cutting system 6, key carriers, 14, and key blanks 15. The automated key duplication system also comprises a key blank storage system 108 and a key blank transfer assembly, with modifications from the embodiments previously described.

As shown in FIGS. 5 and 6, one or more embodiments of an automated key duplication system include a key blank storage system 108 comprising a plurality of rods 112. A plurality of key blanks 15 and/or key carriers 14 are typically removably coupled or mounted to each one of the plurality of rods 112. For example, in the exemplary embodiment shown in FIG. 5, a key blank storage system 108 comprises sixteen rods, each configured to hold fifty key carriers 14. In this embodiment, then, the key blank storage system 108 is configured to hold approximately 800 key blanks 15. Other embodiments comprising fewer and greater numbers of rods 112 each capable of holding fewer and greater key blanks 15 are also contemplated.

FIGS. 5 and 6 also illustrate one exemplary arrangement of the plurality of rods 112 in the key blank storage system 108. Like other key blank storage systems 8 previously described herein, the plurality of rods 112 of the key blank storage system 108 may, in particular embodiments, be arranged in a grid-like system comprising one or more columns of key blanks 15 and one or more rows key blanks 15. The embodiment shown in FIG. 5 comprises two columns each comprising eight rods 112, and thus eight rows of key blanks 15. For more efficient use of space within the housing 2, the rods 112 of the two columns may be offset from one another such that the key blades of key blanks 15 removably coupled to a rod 112 in a first column of rods 112 fits between two rods 112 of a second column of rods 112, as shown in FIG. 5.

In one or more embodiments, the key blank storage system 108 further comprises a plurality of linear springs 124. Typically, the key blanks storage system 108 comprises one linear spring 124 associated with one rod 112 of the plurality of rods 112. For example, an embodiment comprising sixteen rods 112 comprises sixteen linear springs 124, each one of sixteen linear springs 124 associated with a different rod 112 of the sixteen rods 112. In other embodiments, the number of linear springs 124 may be greater than or less than the number of rods 112. Each one of the plurality of linear springs 124 is configured and positioned to advance or bias key blanks 15 and/or key carriers 14 to a product pick-up point on each rod 112. Each linear spring 124 may be coiled about at least a portion of a rod 112, or may alternatively be positioned adjacent to a rod 112. In other embodiments, other springs or biasing elements may be utilized to bias the key blanks 14 and/or key carriers to a product pick-up point on each rod 112. The key blank storage system 108 further comprises a stop element positioned on the rods 112 to prevent the linear springs 124 from biasing the key blanks 15 and/or key carriers 14 off the rods 112 the key retrieving apparatus 128 is positioned to receive one at the product pick-up point.

One or more embodiments of an automated key duplication system further comprise a key blank transfer assembly 110 configured to retrieve one key blank 15 and/or key carrier 14 from the key blank storage system 108 and transfer or move the key blank 15 and/or key carrier 14 to the key cutting system 4 for cutting of the key blank 15 to duplicate a master key. Once the key blank 15 has been cut by the key cutting system 6 to duplicate the master key, the key blank transfer assembly 110 delivers the cut key blank 15 to a duplicated key retrieval opening 26 positioned to allow retrieval of the cut key blank 15 by a user.

One or more embodiments of the key blank transfer assembly comprise at least one horizontal support bar 117 and at least one vertical support bar 119. Although the support bars 117, 119 are described as vertical and horizontal, it is contemplated that the support bars 117, 119 comprise multi-direction support bars 117, 119, and are thus not limited to vertical and horizontal positioning. Positioning of the horizontal support bar 117 and vertical support bar 119 allows key retrieving apparatus 128 (shown in FIG. 7) to move to a desired X, Y coordinate for retrieval of an appropriate key blank 14 coupled to one of the plurality of rods 112. The appropriate key blank 14 may be comprise a key blank 14 selected by a user or identified as by the key identification system 4. Movement along the support bars 117, 119 may be facilitated by rotation of either support bars 117, 119 that in combination with one or more gears effectuates movement of the key retrieving apparatus 128. Alternatively, a motor may move the key retrieving apparatus 128 along the support bars 117, 119. In still other embodiments, movement of the key retrieving apparatus 128 may be effectuated through any number of mechanisms or configurations apparent to a person having ordinary skill in the art.

Figure 7:
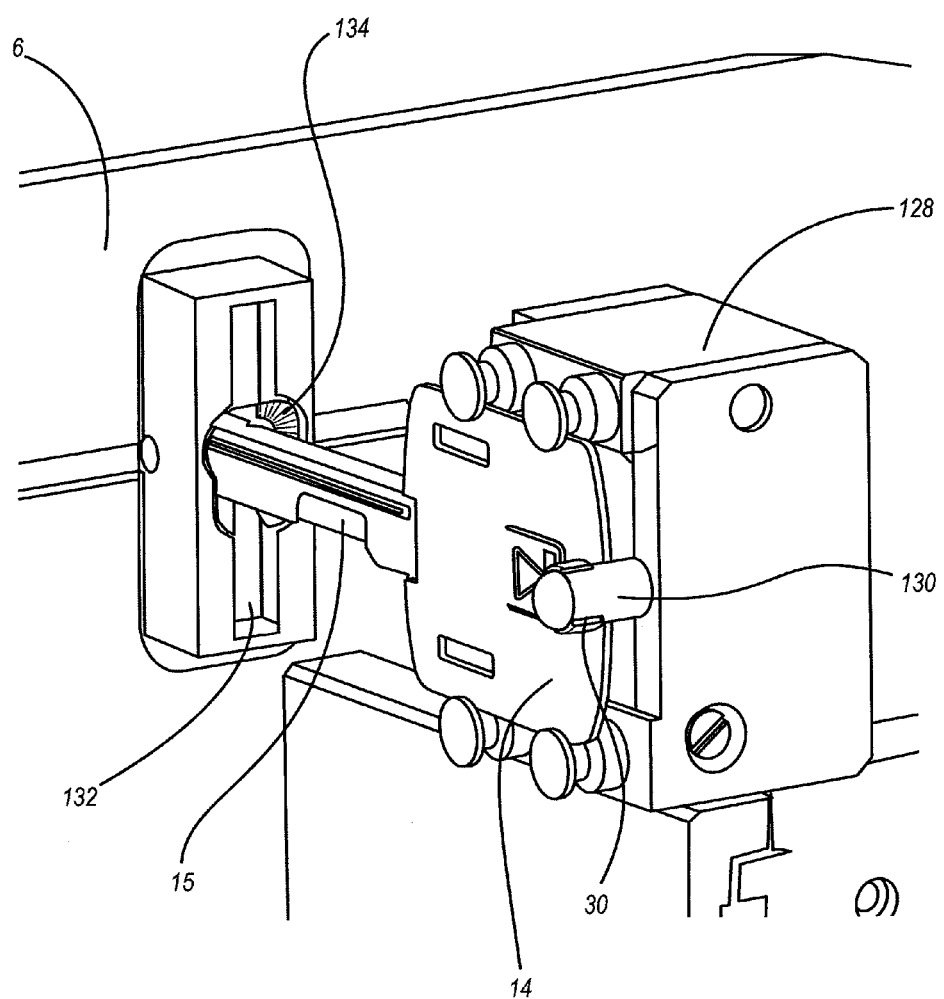
FIG. 7 is a perspective view of a key retrieving apparatus.

FIG. 7 illustrates an exemplary embodiment of a key retrieving apparatus 128 that may be utilized in conjunction with any of the key blank transfer assemblies 10, 110 described herein. Those of ordinary skill in the art will also understand and may devise other key retrieving apparatus which will serve the purposes described herein. Moreover, the key retrieving apparatus 128 shown in FIG. 7 may either move in conjunction with the key transfer assembly 10, 110, or, alternatively remain positioned near the key blank receiver opening 132 even as the key blank transfer assembly 10, 110 retrieves a key blank 15. For example, in one or more embodiments, the key retrieving apparatus 28 clamps a key carrier 15 held in the key blank storage system 8 and moves the key to the key retrieving apparatus 128 positioned proximate the key blank receiver opening 132. Once the key carrier 14 is coupled to the key retrieving apparatus 128, as shown in FIG. 7, the key retrieving apparatus 128 may move toward the key blank receiver opening 132 to insert the blade of the key blank 15 into the key blank receiver opening 132 for key cutting. Once the key is cut, the key retrieving apparatus 128 removes the cut key blank 15 from the key blank receiver opening and ejects the key blank 15 and key carrier 14 from the key retrieving apparatus 128.

In other embodiments, the key retrieving apparatus 128 moves with the key blank transfer assembly 10, 110 to the appropriate position on the grid-like configuration of the key blank storage system 8, 108. As shown in FIG. 7, the key retrieving apparatus comprise one or more tabs 130 that align with one or more apertures 30 on the key carrier 14 for coupling and transfer of the key blank 15 and key carrier 14 to the key cutting system 6.

Figure 8:
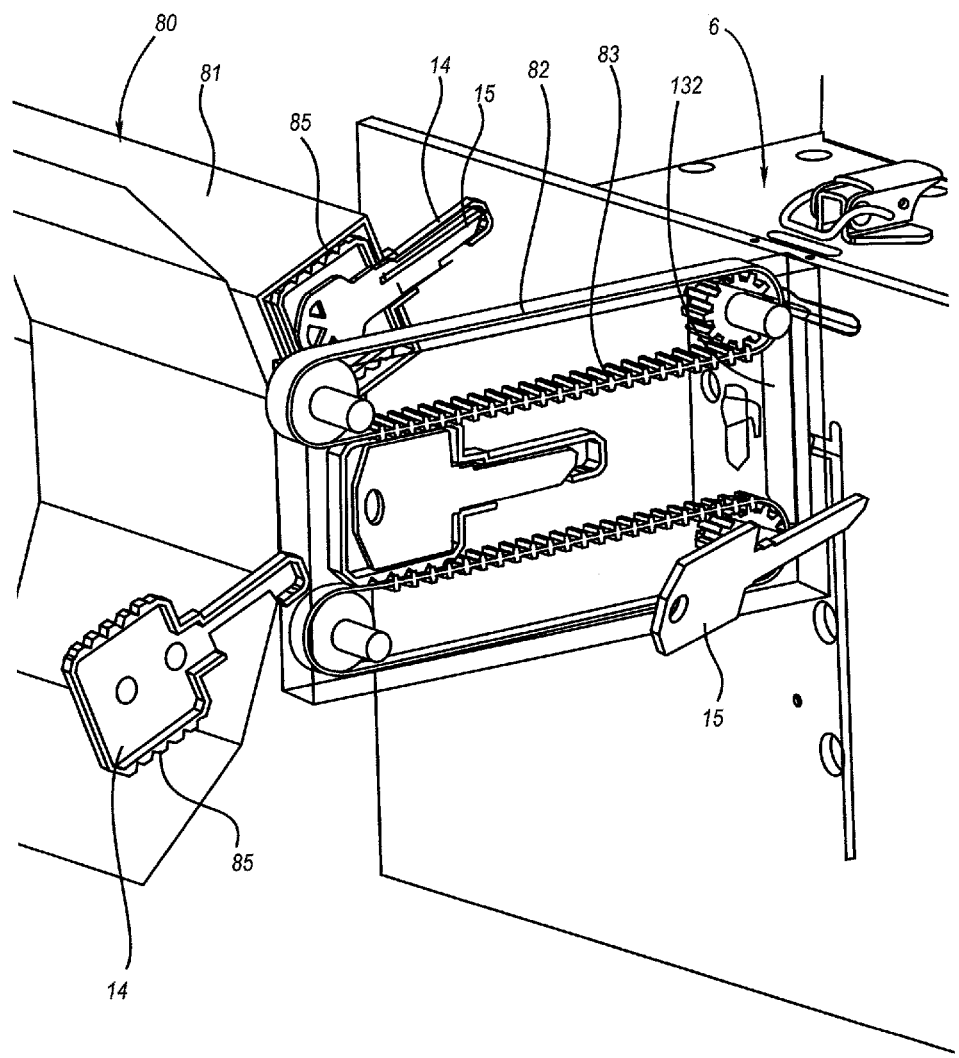
FIG. 8 is a perspective view of aspects of a third embodiment of an automated key duplication system.

FIG. 8 illustrates another embodiment of automated key duplication system that comprises a key blank storage system comprising a carousel 80 housing a plurality of key carriers 14. The carousel may comprise a plurality of feeding sleeves 81 positioned around the carousel 80. Each of the plurality of feeding sleeves 81 is typically configured to house portions of a plurality of key blanks 14 and/or carriers 15. In one particular embodiment, the blade of the key blank 15 and the corresponding portion of the key carrier 14 extend from the feeding sleeve, while the head of the key blank 15 is housed within the feeding sleeve 81. A spring or biasing element may be associated with each feeding sleeve to bias the key blanks 15 and/or key carriers towards an ejecting end of each feeding sleeve 81. Particular embodiments of the key carriers may comprise one or more ridges 85 configured to engage with the belt 83. Alternatively, the key head may be configured with the one or more ridges configured to engage with the belt 83.

In an embodiment comprising a carousel 80 key blank storage system, as well as other key blank storage systems described herein, the key blank transfer assembly of one or more embodiments of the automated key duplication system may comprise a belt drive feeder 82. The belt drive feeder is positioned to receive a key blank 15 from one of the plurality of feeding sleeves 81, move the key blank 15 into the key blank receiver opening 132 of the key cutting system 6 for cutting, and eject the cut key 15 into the duplicated key retrieval opening 26.

In operation, the carousel 81 of the key blank transfer assembly may, upon receiving a command from the user and/or processor 11, rotate to align the proper key blank 15 with the belt drive feeder 82. Once aligned, the appropriate key blank 15 and key carrier 14 are pushed or otherwise moved into the belt drive feeder 82, and one or more belts 83 within the belt drive feeder 82 shuttle the key blank 15 into the key blank receiver opening 132 for cutting in the key cutting system 6. After cutting, the belt 83 of the belt drive feeder remove the key blank 15 from the key blank receiver opening 132, and pins are inserted into holes on the key carrier 14 to eject the key blank 15 from the key carrier 14. Once ejected, the cut key blank 15 falls into the duplicated key retrieval opening 26 and the key carrier 14 runs off the end of the track of the belt drive feeder 82 into a garbage chute.

In any of the embodiments of automated key duplication systems described herein, the system may comprise one or more processors 11 associated with the key identification system 4, the key cutting system 6, the key blank storage system 8, 108, the key blank transfer system 10, 110, or any combination thereof. The one or more processors 11 are configured to run software operative to provide the functions needed to initiate the steps required for key duplication and customer interaction, as well as reporting functions and data transfer between the different systems as needed.

By way of specific example, a person may use the key identification system 4 to identify a master key. The key identification system 4 sends identification data to the processor 11 (e.g. data representing physical characteristics, such as dimensions, patterns, or other parameters indicative of a particular key model either received from the master key identifier or from data input by the operator or a combination of both). The processor 11 may access a database defining what key models are known and determines whether the received identification data corresponds to a known key model, thus attempting to identify the model of the master key. If the master key model can be identified, the processor 11 accesses a database defining which known key models are available at the key blank storage system 8, 108. In particular embodiments with a feedback device, when the processor 11 determines that the model of the master key is not available at the key blank dispensing/vending machine associated with the key identification system 4 or that the key cutting system 6 associated with the key identification system 4 is unable to cut the master key identified, it communicates with the feedback device to provide information to the user as to where the user can go to have a duplicate key cut for that particular master key.

Also contemplated herein are one or more methods for automated duplication of a master key. In one or more embodiments, a method comprises identifying a master key with a key identification system 4. The master key may be identified with any master key identifier disclosed herein, incorporated by reference, or otherwise known in the art, such as but not limited to digital cameras, lasers, and the like. Once the mast key has been identified, one or more embodiments comprise determining a stock-keeping unit (SKU) associated with the identified master key identified. The SKU associated with the identified master key may refer to one or more key blanks that may be cut to duplicate the master key. One or more methods may further comprise determining, with the processor 11, a location or coordinates of the SKU in a grid-like key blank storage system 8, 108 and activating the key blank transfer assembly 10, 110 to align with the coordinates of the SKU.

One or more methods for automated duplication of a master key further comprise moving a key retrieving apparatus 28, 128 of a key blank transfer assembly to the SKU of the key blanks 15 and/or key carriers 14 stored in the key blank storage system 8, 108 and removably coupling or otherwise retrieving a key blank 15 and/or key carrier 14 with the key retrieving apparatus 28, 128. Scanning of the SKU of the SKU of the retrieved key blank 15 and/or key carrier may be performed by a scanner operably coupled to the processor 11 to verify that the retrieved key blank 15 and/or key carrier 14 comprises the desired SKU. One or more methods further comprises transferring the one key blank 15 from the key blank storage system 8, 108 to a key cutting system 6. The method may further comprise inserting the blade of the key blank 15 into a key blank receiving opening 132 of the key cutting system and cutting the key blank 15 with the key cutting system 6 to match the identified master key. Once the key blank has been cut, the method comprises dispensing the cut key blank to a user through the duplicated key retrieval opening 26.

In one or more embodiments, a method for automated duplication of a master key further comprises receiving user instructions or selections on a user interface 13 associated with the processor 11. User instructions or selections may, in various embodiments, pertain to the type of master key being identified (such as home, automobile, etc.), the desired key blank 15, the style of key blank 15, the number of duplicated keys desired, and the like.

It will be understood that implementations are not limited to the specific components disclosed herein, as virtually any components consistent with the intended operation of a method and/or system implementation for an automated key duplication system may be utilized. Accordingly, for example, although particular systems may be disclosed, such components may comprise any shape, size, style, type, model, version, class, grade, measurement, concentration, material, weight, quantity, and/or the like consistent with the intended operation of a method and/or system implementation for an automated key duplication system may be used.

In places where the description above refers to particular implementations of an automated key duplication system, it should be readily apparent that a number of modifications may be made without departing from the spirit thereof and that these implementations may be applied to other an automated key duplication system. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An automated key duplication system, comprising:
   a system housing;
   a key identification system housed at least partially within the system housing and configured to identify a master key;
   a key cutting system housed within the system housing;
   a key blank storage system housed within the system housing and comprising a plurality of rods, a plurality of key carriers removably coupled to the plurality of rods, and a plurality of key blanks, each one of the plurality of key blanks coupled to a different one of the plurality of key carriers;
   a key blank transfer assembly housed within the system housing and comprising a key retrieving apparatus, the key blank transfer assembly configured to remove one key carrier of the plurality of key carriers from the key blank storage system with the key retrieving apparatus and transport the one key carrier and the key blank coupled thereto from the key blank storage system to the key cutting system; and
   a duplicated key retrieval opening positioned on the system housing to receive the one key blank after the one key blank has been cut.

2. The automated key duplication system of claim 1, further comprising one or more processors in communication with the key identification system, the key cutting system, the key blank storage system, and the key blank transfer assembly, wherein the one or more processors are configured to receive master key information from the key identification system, access a database defining a plurality of known key models, compare physical characteristics of the master key with physical characteristics of key models in the database to identify a model of the master key, and determine one or more key blanks of the plurality of key blanks that are suitable for cutting to match the master key.

3. The automated key duplication system of claim 2, wherein the key retrieving apparatus is movable along a vertical axis and a horizontal axis to align with the one key carrier, and movable from the key blank storage system to a key blank receiving opening of the key cutting system.

4. The automated key duplication system of claim 3, wherein the plurality of key carriers are positioned by key blank type in at least two rows and at least two columns in the key blank storage system.

5. The automated key duplication system of claim 3, wherein each of the plurality of key carriers are removably mounted between slots on adjacent rods of the plurality of rods.

6. The automated key duplication system of claim 5, wherein the key blank transfer assembly further comprises a horizontal belt system that moves the key retrieving apparatus along the horizontal axis and a vertical belt system that moves the key retrieving apparatus along the vertical axis.

7. The automated key duplication system of claim 6, wherein the key blank storage system comprises a double-sided storage system comprising two opposing series of rods of the plurality of rods, and wherein the key blank transfer assembly is positioned between the two opposing series of rods of the plurality of rods, the key retrieving apparatus having access to key carriers mounted among each of the two opposing series of rods.

8. The automated key duplication system of claim 2, further comprising a plurality of linear springs, each linear spring coupled to a different rod of the plurality of rods and configured to bias the plurality of key carriers towards the key blank transfer assembly.

9. The automated key duplication system of claim 8, wherein each key carrier of the plurality of key carriers comprises one or more apertures and the key retrieving apparatus comprises one or more tabs positioned to engage with the one or more apertures when the key blank transfer assembly moves the one key carrier from the key blank storage system to the key cutting system.

10. The automated key duplication system of claim 2, further comprising a user interface in electronic communication with the one or more processors.

11. The automated key duplication system of claim 4, wherein the key retrieving apparatus comprises a clamp and the plurality of rods comprises at least four rods, each of the at least four rods extending through an aperture on a different one or more of the plurality of key carriers.

* * * * *